Feb. 28, 1939.　　　　　G. ROÈS　　　　　2,148,837
PROGRESSIVE ACTING CHANGE-SPEED GEAR FOR BICYCLES
Filed Aug. 3, 1937　　　2 Sheets-Sheet 1
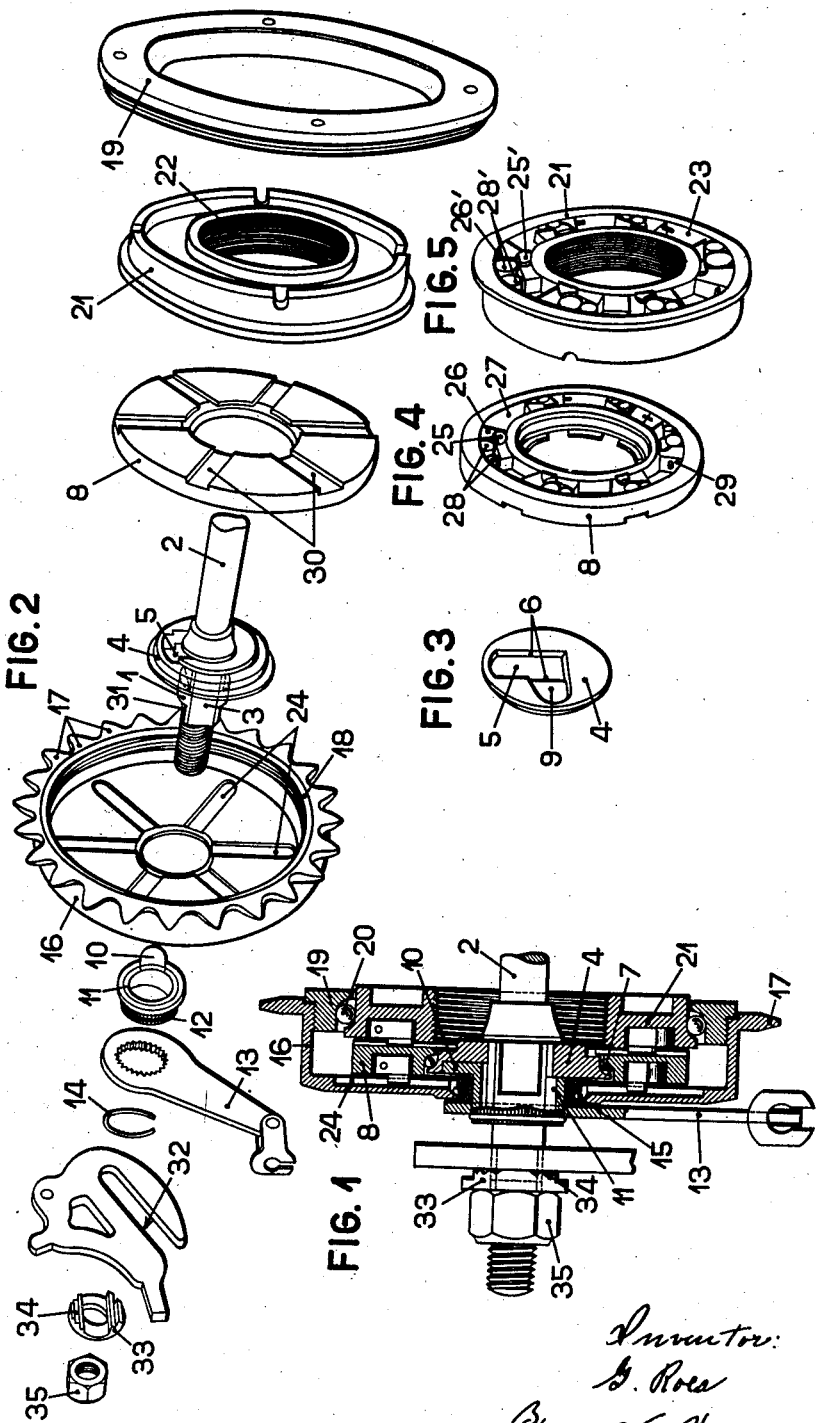

Feb. 28, 1939. G. ROÈS 2,148,837
PROGRESSIVE ACTING CHANGE-SPEED GEAR FOR BICYCLES
Filed Aug. 3, 1937 2 Sheets—Sheet 2

Patented Feb. 28, 1939

2,148,837

UNITED STATES PATENT OFFICE 2,148,837

PROGRESSIVE ACTING CHANGE-SPEED GEAR FOR BICYCLES

Georges Roès, Paris, France

Application August 3, 1937, Serial No. 157,194
In France August 10, 1936

2 Claims. (Cl. 74—117)

The present invention has for its object a novel progressive acting change-speed gear for bicycles.

Said change-speed gear, which is very compact and very simple, has the form of a rear pinion of a bicycle called free wheel pinion and is adapted to replace the toothed pinion of the rear wheel of ordinary bicycles. The said change-speed gear enables the desired variations of speed to be obtained which are suited to the cross-section of the road.

In the accompanying drawings, one embodiment of the invention has been shown diagrammatically and only by way of example:

Fig. 1 shows in section a change-speed gear constructed according to the invention;

Fig. 2 shows in perspective and in their order of mounting, the assembly of the parts which form the change-speed gear shown in section in Fig. 1;

Figs. 3, 4 and 5 show certain members already shown in Fig. 2, but on their opposite face;

Figure 6:
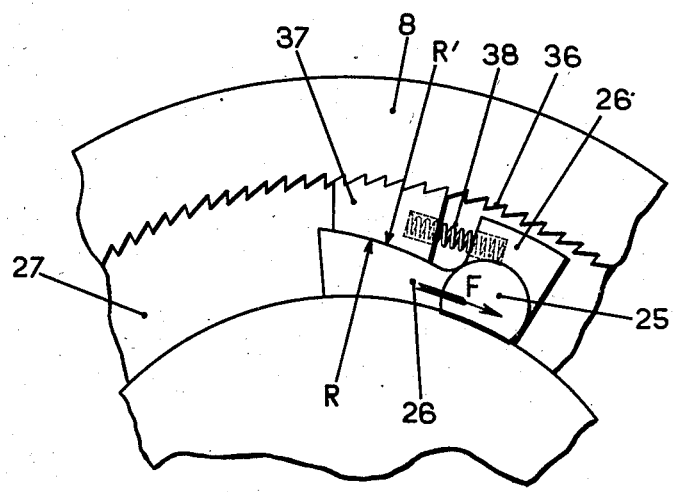
Fig. 6 shows diagrammatically a form of construction of one of the improved free wheel elements.

As seen in the drawings, a part 1 having a flat portion and a cone is screwed on to the axle 2 of the rear wheel hub of the bicycle and serves for adjusting said wheel. Said part 1 has two flat portions 3 on which is mounted a movable cup 4 one of the faces of which is seen in Fig. 2 and the other face in Fig. 3; said cup is adapted to move transversely on the two aforesaid flat portions 3; to permit this movement said cup is provided with a slot 5 the two parallel edges 6 of which slide on the flat portions 3.

On the cup 4 is placed a row of balls 7 which support a plate 8 rotating freely on the row of balls; one face of said plate 8 is shown in Fig. 2 and the other face in Fig. 4.

On one face of the movable cup 4 is milled depthwise a recess 9 of appropriate shape in which engages an actuating cam 10 secured to a part 11 which rotates freely on the part or sleeve 1 which is screwed on the axle 2 of the wheel hub; said part 11 has on the opposite side to the cam, an annular surface provided with slots 12 which enables a lever 13 held by a wire ring 14 to be accommodated.

On the part 11 which carries the cam 10 is mounted, with an appropriately tight fit, a ball bearing 15 which supports the case 16 carrying the sprocket 17.

Inside the case 16 is provided a thread 18 which receives the adjusting nut 19.

In the adjusting nut is mounted a ball bearing 20 to permit of the rotation of a receiving ring 21 one of the faces of which ring is shown in Fig. 2 and the other face in Fig. 5.

The receiving ring 21 is fixed on the hub of the bicycle wheel by means of the tapping 22 and is provided with a circular groove 23 (see Fig. 5) in which are engaged the elements of a free wheel mechanism which will be referred to hereinafter.

Inside the case 16 is provided a number of radial grooves 24 which are milled to a certain depth; six of such grooves have been shown in Fig. 2, but it is obvious that a greater number of grooves could be utilized if desired. In each of said radial grooves is engaged a trunnion 25 which is secured to the runner of a free wheel mechanism element mounted in the circular groove 27 provided on one of the faces of the plate 8. It is obvious that in said groove 27 as many runners 26 are provided as there are grooves 24. The portion of the runner 26 which is on the opposite side to the trunnion 25 forms an incline on which rest two rollers 28. A spring pressed push rod 29 is mounted in the runner to compel the two rollers 28 to mount the incline.

On the face of the plate 8 which is opposite the face on which is located the groove 27, is provided a number of radial grooves 30 which are identical with the grooves 24 of the case. The trunnions 25' of the free wheel mechanism elements which are mounted in the groove 23 of the receiving ring 21, engage in said grooves 30.

The end of the part 1 is engaged, by means of the two other flat portions 31, in the slot 32 of the rear fork of the bicycle frame and the whole arrangement is held in position by a washer 33 having claws 34 and by a nut 35.

The operation of the change-speed gear which has just been described is as follows:

When, by means of the lever 13, the cam 10 has been placed in a position in which it is perpendicular to the flat portions of the part 1, the movable cup 4 on which the plate 8 rotates is concentric with the case 16 and with the receiving ring 21.

Under the action of the pedals and of the chain, the case 16 is rotated in the direction of operation. The runners 26 which have their trunnions engaged in the radial grooves 24, are moved in the same direction, the rollers 28 jamming themselves between the outer surface of the groove 27 and the inclines of the runners. Under these conditions, the plate 8 is rotated at the same speed as the case; the same applies to the receiving ring 21 which operates in the same manner as the plate 8.

In this position, the case 16 and the receiving ring 21 therefore rotate at the same speed.

By acting on the lever 13, it is possible at a given instant, according to the cross-section of the road, to modify the position of the cam 10, whereby the movable cup 4 is caused to slide on the two flat portions 3. At this instant, the movable cup 4 and the plate 8 are eccentric relatively to the case 16 and the receiving ring 21; a gearing up thus occurs in the manner which will be explained. The runners 26 with their rollers are engaged, as stated, in the groove 27 of the plate 8 and their trunnions 25 are engaged in the radial grooves 24 of the case; only one of said runners (the one which is farthest away from the centre of the case) has a driving action, in other words it is said runner which rotates the plate 8 during the time taken by the case to travel through the angle between two radial grooves 24; during this period, the plate 8 is driven at a greater angular speed than the case; the other runners free wheel during this time, but they take up the load in turn and impart to the plate 8 the higher corresponding angular speed.

The same thing occurs between the plate 8 and the receiving ring. It ensues that according to the amount of eccentricity which has been given the plate 8 through the lever 13, the cam 10 and the movable cup 4, the receiving ring which is secured to the wheel passes from a speed which is equal to that of the case (when the plate 8 is centered in the apparatus) to a greater speed which increases progressively with the eccentricity given to the plate 8.

The existence of the two ball bearings 15 and 20 gives the apparatus perfect stability, eliminates off-setting and provides very smooth running.

In the embodiment of Figs. 1 to 5, each free wheel element, the tenon of which is driven by a radial groove of the actuating member, comprises a runner having an incline associated with rollers the whole of this runner roller arrangement being arranged in a circular groove of the driven member.

The present invention has also for its object an improvement, on the one hand in the free wheel elements shown in Figs. 1 to 5, and on the other hand in the circular groove of the driven member or of the driving member, which groove co-operates with the free wheel elements in question.

According to the embodiment shown in particular in Fig. 6, each free wheel element comprises two blocks having complementary inclines, said blocks being subjected to the action of a spring which, under the effect of the inclines, tends to move them apart; the one of the two blocks which is located adjacent the periphery is furthermore provided with a toothing adapted to mesh with a corresponding toothing in the groove of the driven member.

As seen in Fig. 6, 8 is the driven member in which is located the circular groove or recess 27.

The surface of the said groove, which is located towards the periphery of the latter, has a toothing 36 therein. The free wheel element, which is driven in the direction of the arrow F by the trunnion 25 which is engaged in a radial groove of the driving element, has, as in the example shown in Figs. 1 to 5, a runner 26 provided with an incline R but, instead of co-operating, as previously, with rollers, said runner co-operates in this case with a block 37 which has an incline R' which is the complement of the incline R; said block 37 furthermore carries a toothing adapted to co-operate with a toothing 36 of the groove 27.

A spring 38, which bears on the portion 26' of the runner 26, tends to push the block 37 back so that the free wheel element can drive the driven member 8 at the exact instant (consequently without slip) when the said free wheel element is playing its part of a driving member.

Of course, the device which has been described above and which is shown in the drawings, has only been given by way of example; modifications could be made in the details of construction without for that reason altering the general spirit of the invention.

It is obvious furthermore that the aforesaid change-speed gear device which has been described as applied to bicycles, could be utilised with other mechanisms.

What I claim is:

1. A continuously variable change-speed device for bicycles comprising a driving case, an intermediate plate movable in its own plane and a ring fixed to the hub of the road wheel of the bicycle, a series of one-way grip devices located in radial and annular grooves formed respectively in the case and the intermediate plate, a series of one-way grip devices located in radial and annular grooves respectively in the intermediate plate and the ring and means for varying the eccentricity of the intermediate plate relatively to the case and the ring, the arrangement being such that the ring can be driven from the case at a ratio lying between 1 to 1 and a higher maximum according to the eccentricity of the intermediate plate, and central means for varying that eccentricity comprising a slotted member supporting the plate arranged for movement transversely to the axis of the axle under the control of a lever turning about that axle and operable from outside the case and acting on the slotted member through a lug or dog.

2. A progressive change-speed gear device for bicycles, comprising a case, radial grooves in the said case for receiving free wheel elements, a movable plate driven by the said elements, a series of radial grooves on the outer face of the movable plate, the said grooves cooperating with another series of free wheel elements, which form part of a receiving ring fixed to the hub of the wheel for transmitting to the latter a geared up movement when the said movable plate has been given a certain amount of eccentricity, a free wheel element comprising blocks having inclines which are complementary, one of said blocks having a trunnion adapted to engage one of the radial grooves of the driving member, the other block being spring actuated on the incline of the first mentioned block and having teeth adapted to mesh with corresponding teeth on the driven member which receives the said free wheel elements.

GEORGES ROËS.